(12) United States Patent
Olofsson et al.

(10) Patent No.: US 6,668,159 B1
(45) Date of Patent: Dec. 23, 2003

(54) TERMINAL BITRATE INDICATOR

(75) Inventors: Håkan Olofsson, Stockholm (SE); Peter Schramm, Erlangen (DE); Frank Muller, Sollentuna (SE); Johan Sköld, Åkersberga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/200,882

(22) Filed: Nov. 30, 1998

(51) Int. Cl.[7] .............................................. H04B 17/00
(52) U.S. Cl. .................... 455/67.1; 455/423; 455/67.4; 455/226.1; 702/66
(58) Field of Search ...................... 455/67.1, 67.4, 455/67.5, 67.6, 67.7, 226.1, 226.2, 226.3, 522, 226.4, 423, 67.11–67.14, 566, 561, 562; 702/57, 66, 81; 324/612, 637, 76.11; 370/329

(56) References Cited

U.S. PATENT DOCUMENTS

| | | | |
|---|---|---|---|
| 5,175,867 A | | 12/1992 | Wejke et al. |
| 5,483,676 A | * | 1/1996 | Mahany et al. .......... 455/67.14 |
| 5,487,174 A | * | 1/1996 | Persson ...................... 455/522 |
| 5,577,087 A | | 11/1996 | Furuya |
| 5,612,948 A | * | 3/1997 | Fette et al. ................. 379/252 |
| 5,745,523 A | | 4/1998 | Dent et al. |
| 5,802,039 A | | 9/1998 | Obayashi et al. ........... 370/216 |
| 6,028,851 A | * | 2/2000 | Persson et al. ............. 370/329 |
| 6,069,884 A | * | 5/2000 | Hayashi et al. ............. 370/335 |
| 6,108,374 A | * | 8/2000 | Balachandran et al. ..... 375/227 |
| 6,134,457 A | * | 10/2000 | Ha et al. .................... 455/561 |
| 6,157,845 A | * | 12/2000 | Henry et al. ................ 455/566 |
| 6,167,283 A | * | 12/2000 | Korpela et al. ............. 455/525 |
| 6,397,082 B1 | * | 5/2002 | Searle ...................... 455/562.1 |
| 6,539,205 B1 | * | 3/2003 | Wan et al. .................. 455/67.1 |

FOREIGN PATENT DOCUMENTS

| | | |
|---|---|---|
| EP | 0 877 533 | 11/1998 |
| WO | 98/37710 | 8/1998 |

* cited by examiner

*Primary Examiner*—Edward F. Urban
*Assistant Examiner*—Lana Le

(57) ABSTRACT

A bit rate indicator for use in the mobile station of a radiotelephone system which provides an indication to the user of the maximal bit rate available in the current cell and the predicted bit rate the user can expect to achieve if a session were initiated in his present location. In calculating the maximal bit rate, the mobile station receives a message from the base station indicating the base station's capabilities, such as support for multi-slot operations and coding/modulation schemes. The mobile station then uses the base station's capabilities along with its own capabilities to determine the maximal bit rate. In calculating predicted bit rate, the mobile station measures the link quality of at least one channel and based on, at least one of, the measured link quality and mobile's capabilities, determines a predicted bit rate the user would achieve in his present location. Both the maximal and predicted bit rates can be outputted on the mobile station for comparison by the user. This information can be used to effectively direct the user to the location in a cell with the best link quality. The present invention may be especially useful when using a mobile station to interface with the Internet.

9 Claims, 5 Drawing Sheets

Flow diagram of an embodiment of the invention.

Flow diagram of an embodiment of the invention.

Idle mode operation of a 4-slot mobile station in an HLM cell.

TERMINAL BITRATE INDICATOR

BACKGROUND

The present invention generally relates to the field of communications systems and, more particularly, to the field of radio communications systems which measure transmission quality.

Commercial communication systems and, in particular, cellular radiotelephone systems have experienced explosive growth in the past decade. This growth is due, at least in part, to the improvement in the number and quality of services provided by radiocommunication systems. For example, early systems were designed primarily to support voice communications. However, cellular radiocommunication systems now provide many additional services including, for example, paging, messaging and data communications (e.g., to support Internet communication). Some of these new services make higher throughputs, than needed for voice communication, very desirable.

In order to provide these various communication services, a corresponding minimum user bit rate is required. For example, for voice and/or data services, user bit rate corresponds to voice quality and/or data throughput, with a higher user bit rate producing better voice quality and/or higher data throughput. The total user bit rate is determined by a selected combination of techniques, e.g., speech coding, channel coding, modulation scheme, and the air interface resources allocated to the connection, i.e., for a TDMA system, the number of assignable time slots, for a CDMA system the number of spreading codes.

Consider the impact of different modulation schemes on the user bit rate. Conventionally, different digital communication systems have used a variety of linear and non-linear modulation schemes to communicate voice or data information. These modulation schemes include, for example, Gaussian Minimum Shift Keying (GMSK), Quadrature Phase Shift Keying (QPSK), 8-ary Phase Shift Keying (8PSK), Quadrature Amplitude Modulation (QAM), etc. Typically, each communication system operates using a single modulation scheme for transmission of information under all conditions. For example, ETSI originally specified the GSM standard to communicate control, voice and data information over links using a GMSK modulation scheme to provide transmission of information.

Depending on the modulation scheme used by a particular system, the throughput of a packet transmission scheme deteriorates differently as C/I levels decrease. For example, modulation schemes may use a different number of values or levels to represent information symbols. The signal set, i.e., amplitude coefficients, associated with QPSK, an exemplary lower level modulation (LLM) scheme, are illustrated in FIG. 1(a). By way of comparison, 16QAM is a higher level modulation (HLM) scheme having the signal set depicted in FIG. 1(b).

As can be seen in FIGS. 1(a) and 1(b), the minimum Euclidean distance between the coefficients in the LLM scheme is greater than the minimum Euclidean distance between coefficients in the HLM scheme for the same average signal power, which makes it easier for receive signal processing to distinguish between modulation changes in the LLM scheme. Thus, LLM schemes are more robust with respect to noise and interference, i.e., require a lower carrier-to-interference (C/I) level to achieve acceptable received link quality. HLM schemes, on the other hand, provide greater user bit rates, e.g., 16QAM provides twice the user bit rate of QPSK, but require higher C/I levels.

More recently, however, dynamic adaptation of the modulation used for transmission in radiocommunication systems types has been considered as an alternative that takes advantage of the strengths of individual modulation schemes to provide greater user bit rates and/or increased resistance to noise and interference. An example of a communication system employing multiple modulation schemes is found in U.S. Pat. No. 5,577,087. Therein, a technique for switching between 16QAM and QPSK is described. The decision to switch between modulation types is made based on quality measurements.

In addition to modulation schemes, digital communication systems also employ various techniques to handle erroneously received information. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding of the data prior to modulation. FEC coding involves representing a certain number of data bits using a certain number of code bits. Thus, it is common to refer to convolutional codes by their code rates, e.g., ½ and ⅓, wherein the lower code rates provide greater error protection but lower user bit rates for a given channel bit rate. By adjusting the coding rate, the effective data throughput in a radiocommunication system can also be adjusted. Thus it can be seen that a number of techniques are contemplated for implementing variable data rates transmission in radiocommunication systems.

In standard remote terminals in use today, there is normally an indication of the received signal strength provided on the terminal's display. However, this indicator only provides a very rough estimation of system quality available to the user. Further, for a data user, it is impossible to predict the achievable bit rate or throughput from the signal strength indication on conventional terminals. To obtain an accurate prediction of transmission throughput capabilities, factors such as: downlink interference from other cells on channels assigned to the current cell; carrier to interference ratio (C/I); bit error rate; block error rate; and time dispersion, along with received signal power should be taken into account. Two other factors which affect transmission throughput and should be accounted for are: support for multi-slot operation and support for different coding/modulation schemes.

Accordingly, it would be desirable to provide remote stations with a throughput indication, so that the users can adapt their interactions with the system accordingly.

SUMMARY

The present invention provides a user with information regarding the throughput that he or she can expect to achieve, if the user were to initiate a connection in his present location. For example, the system can provide an indication of the maximal bit rate capabilities that are anticipated for a data connection with the system given, for example, the remote station's current location and both the mobile station and the base station's capabilities.

According to one exemplary embodiment of the present invention there is provided a method for indicating a predicted transmission throughput at a mobile station, comprising the steps of: measuring link quality of at least one channel; estimating the predicted transmission quality based on, at least one of, the mobile station's capability and said link quality; and outputting the predicted transmission quality at the mobile station.

According to another embodiment of the invention there is provided a method for indicating a maximal transmission quality available within a cell, comprising the steps of: receiving at a mobile station, a message from a base station indicating a maximal base station transmission quality capability; determining the maximal transmission quality of a connection based on said maximal base station transmission quality capability and a maximal mobile station transmission quality capability; and outputting the maximal transmission quality at the mobile station.

According to another embodiment of the invention there is provided a method for indicating at the mobile station, both the maximal transmission quality which is possible within the current cell and the predicted transmission quality the user would achieve if a session were initiated at that time. By providing the user with both the maximal bit rate and the predicted bit rate, the user can compare the two indicators and make an informed decision as to whether or not he should move prior to initiating a connection.

Other features and advantages of the present invention will become apparent from the following detailed description, taken in conjunction with the accompanying drawings, which illustrate, by way of example, the principles of the invention.

DETAILED DESCRIPTION

According to exemplary embodiments of the present invention, network capabilities, such as the maximal bit rate available within a cell and the predicted bit rate which the user would achieve in his current location, are examples of information that can be provided to the user and displayed (or otherwise output) by his or her terminal. For example, if a user has a large file to download and a limited amount of time or battery power, it would be helpful if he or she were provided with an indication of the network's throughput capabilities. This information would empower the user so that he or she could decide whether to download the large file now or, possibly, move to a more advantageous location which has a better predicted throughput rate. By comparing the maximal and predicted bit rates the user can make an informed decision regarding whether to download now or move to a location in which the predicted bit rate is closer to the maximal bit rate, before initiating the download.

Figure 1A:
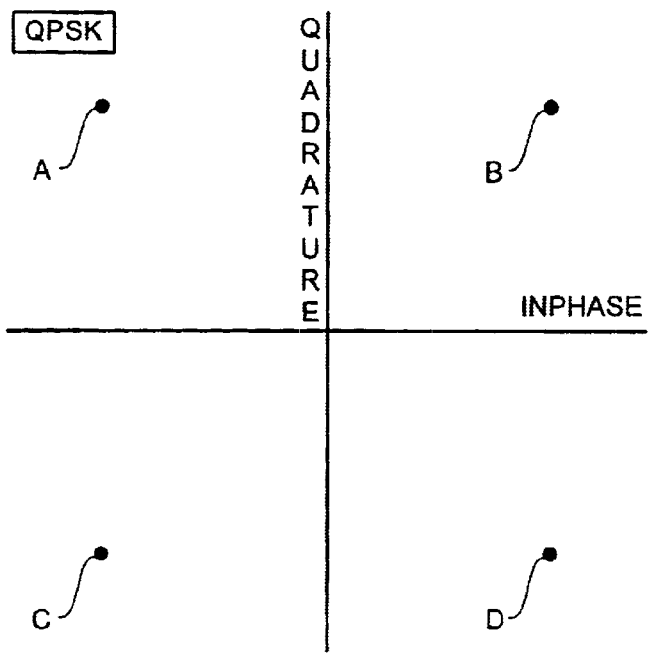
FIGS. 1(a) and (b) are diagrams of modulation constellations for QPSK and 16QAM modulation schemes, respectively.
Figure 1B:
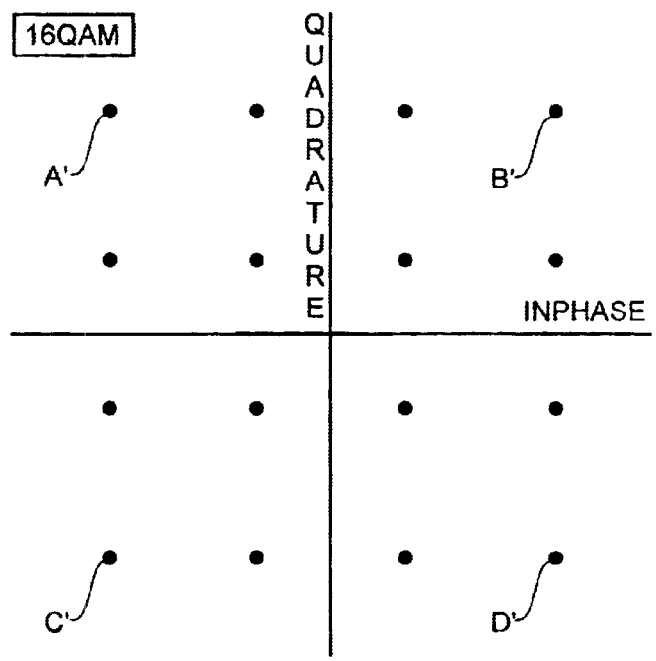
Figure 2:
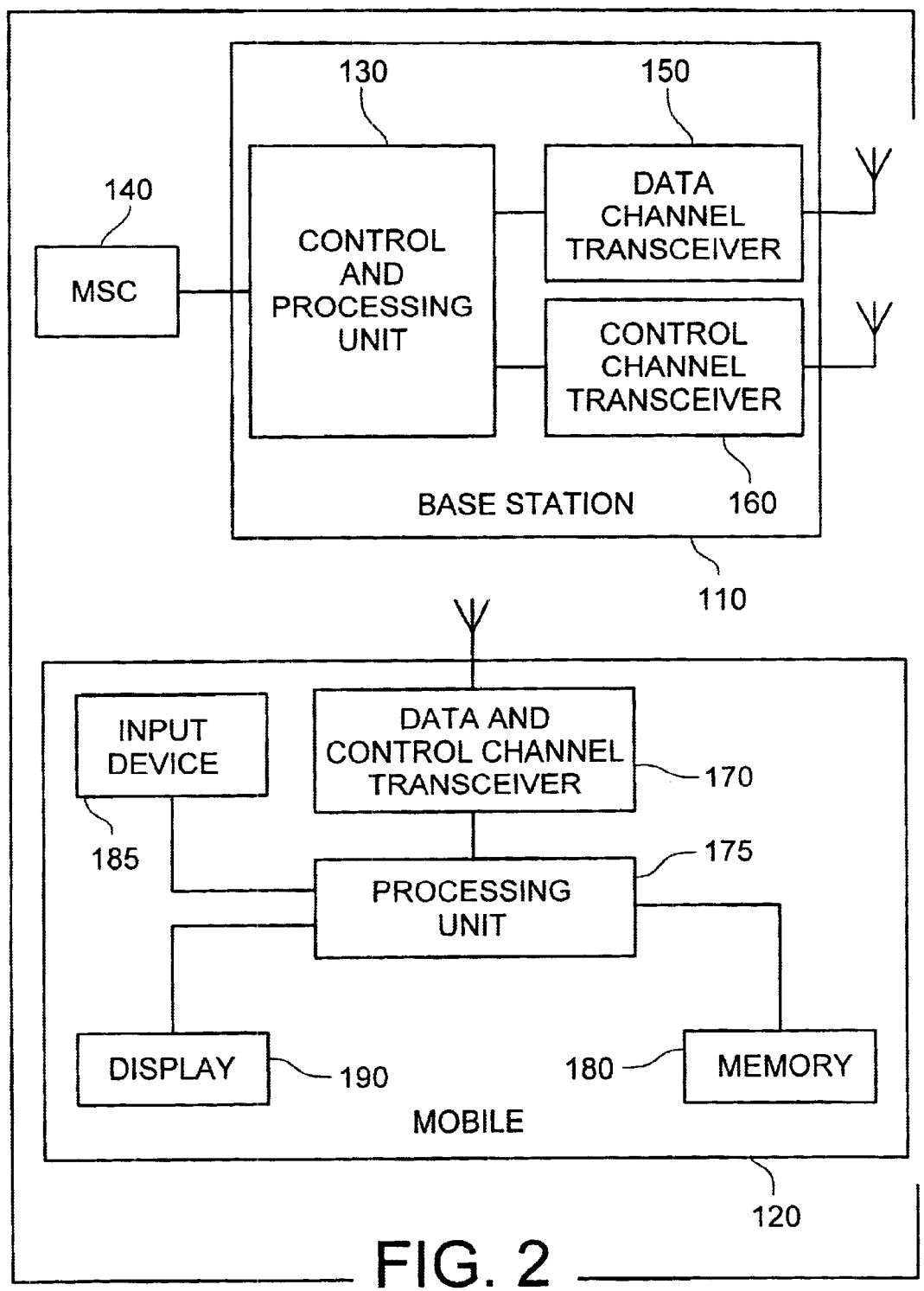
FIG. 2 is a block diagram of an exemplary cellular mobile radiotelephone system.

FIG. 2 represents a block diagram of an exemplary cellular mobile radiotelephone system, including an exemplary base station 110 and mobile station 120, in which the present invention can be implemented. The base station includes a control and processing unit 130 which is connected to the mobile service switching center, MSC 140, which in turn is connected to a packet switched network via a serving GPRS support node, SGSN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent Application Ser. No. 07/967,027 entitled "Multi-mode Signal Processing," which was filed on Oct. 27, 1992, both of which are incorporated in this application by reference.

The base station 110 handles a plurality of data channels through a data channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the data and control transceiver 170 in mobile station 120.

Mobile station 120 receives the information broadcast on a control channel at its data and control channel transceiver 170. Then, the processing unit 175 evaluates the received control channel information, which includes the characteristics of cells that are candidates for the mobile station to lock on to, and determines on which cell the mobile should lock. In the present invention the broadcast control channel is also used to send a message to the mobile station indicating the capabilities of the base station. As mentioned above, these capabilities include information regarding the base station's support for multi-slot operation and/or modulation/coding schemes. Once the mobile station has received this information, it compares it's own capabilities with those supported by the base station and determines the maximal bit rate achievable in that cell, as described below. This information is then output to the user and is also used in calculating a predicted bit rate.

The mobile station 120 also includes an input device 185, such as a numeric keypad, which allows a user to interact with the mobile station. A display device 190, such as an LCD screen, provides a visual display of information to the user, e.g., indicators of maximal and/or predicted throughput as described below. The mobile station may also be a PC card, e.g., PCMCIA, connected to a PC, e.g., laptop. In this case the display device would be the PC monitor. The mobile station also includes memory 180, which may include a preprogrammed address having the terminal's capabilities stored therein. Since the terminal's capabilities may be limited by the type of subscription held by the user, such limitations would need to be known by the terminal for calculation purposes. This information may be provided to the terminal in a number of ways. For example, the information may be stored on the user's subscriber interface module (SIM) card which is inserted in the terminal or, the subscription information may be signaled to the terminal at call setup/login.

In one embodiment of the present invention, the data and control transceiver 170 receives a message from the base station indicating the base station's transmission capabilities. Processing unit 175 then uses this information along with the mobile station's capabilities, which are available at the mobile station, to determine a maximal mobile station transmission capability. In another embodiment of the present invention the data and control channel transceiver receives a signal over at least one channel and based on, at least one of, the received link quality, the base station's capabilities and the mobile station's capabilities, determines a predicted transmission quality. Processing unit 175 calculates this predicted transmission quality. The above maximal transmission quality and predicted transmission quality can then be output to the user either individually or together for comparison.

Figure 3:
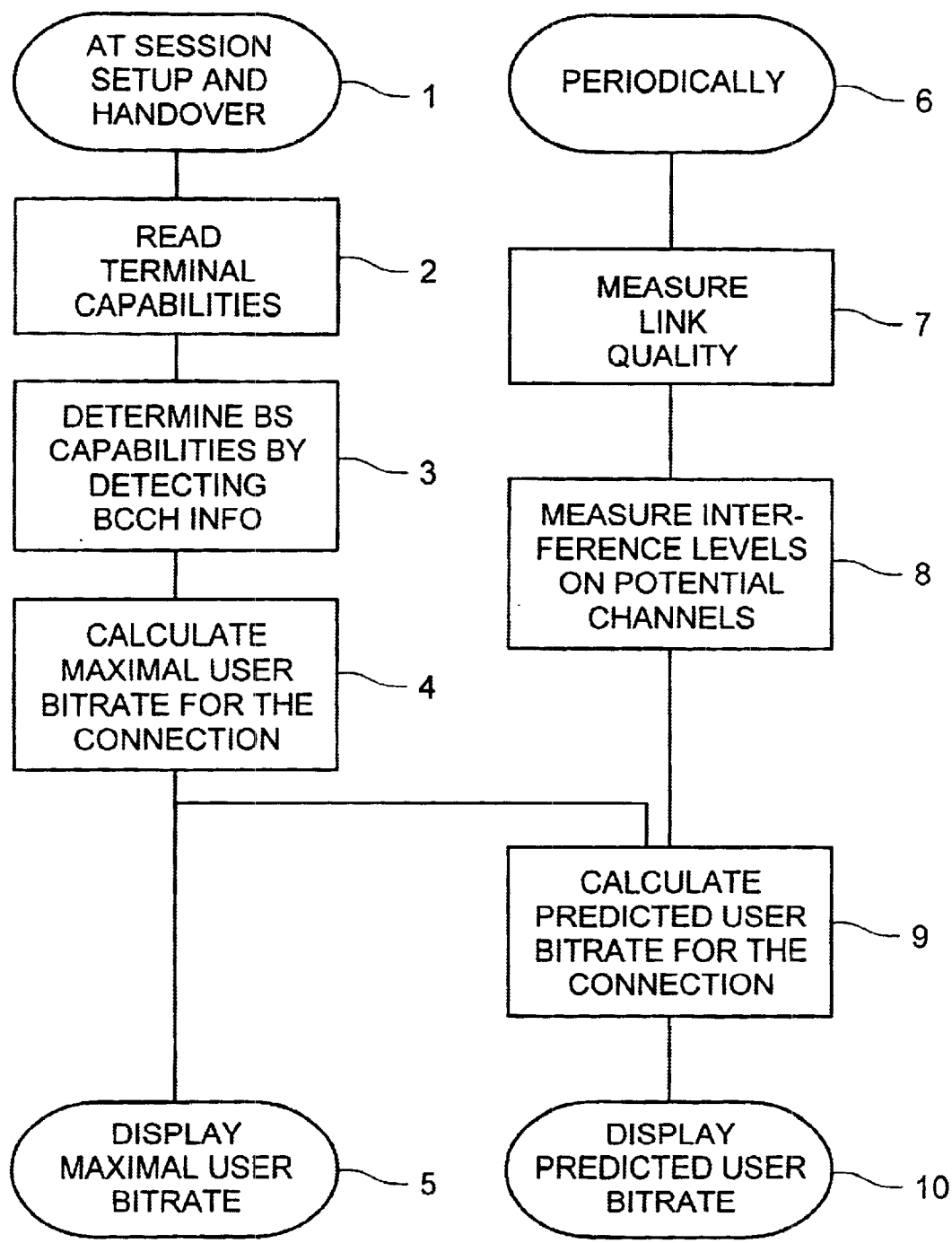
FIG. 3 is a flowchart depicting an exemplary embodiment of the present invention.

Referring to FIG. 3, blocks (1 & 2), an exemplary method for determining and outputting a maximum available bit rate according to the present invention will now be described. At call setup and handover the capabilities of the terminal are read, e.g., from memory 180, at step 2. It should be pointed out that terminals include, but are not limited to, cellular telephones. Typical capabilities that are read include, for example, terminal support for multi-slot (or multi-code) operations and terminal support for different coding/modulation schemes. Some terminals, in GSM for example, can operate using multiple time slots per frame to increase their data throughput. The maximal number of slots depends on the mobile class. Different mobile classes are defined in GSM Specification 05.02, Annex B.1. As described above, enhanced versions of GSM, called EDGE, also have support for different modulation/coding schemes which effect the maximal bit rate. Again this support depends on the mobile class. Information regarding support, or lack thereof, for these capabilities is available within the terminal itself.

Continuing in FIG. 3, step 3, the capabilities of the base station (BS) are determined next. As with the mobile station, typical capabilities that are determined include, but are not limited to, base station support for multi-slot (or multi-code) operations and base station support for different coding/modulation schemes. Although a base station may technically support different numbers of slots/user and different modulation/coding schemes, it may elect to indicate support for only a subset of its capabilities at any given time. For example, in those instances when the base station has a high traffic load, e.g., is supporting a large number of mobiles, the maximal number of slots allocatable to a new user might be reduced. This information, along with which coding/modulation schemes supported by the base station, would then be broadcast by the base station on, for example, the broadcast control channel (BCCH) to all users in a cell. In this example a high traffic load is shown to influence the maximal bit rate by causing the base station to indicate only a subset of its capabilities, i.e., a reduced number a slots which can be allocated to a new user. It should be understood that traffic load could also be ignored in the calculation of maximal bit rate, as is done in the discussion of FIG. 5(*c*), below. In step 4, the maximal user bit rate is calculated, based on the above mentioned capabilities of both the mobile station and the base station. For a situation in which both the mobile and base station support 4 time slots and coding scheme 1 (CS-1), which GSM specifies as having a data rate of 9.05 kbps, the maximal user bit rate would be 4×9.05 or 36.2 kbps. This information is then presented to the user in step 5, e.g., on the display or as a prerecorded voice message.

The second column in FIG. 3 illustrates the steps which can be taken in determining a predicted bit rate that the user can expect to achieve if a communication session were initiated at that time. As will be appreciated by those skilled in the art, and as is illustrated more graphically below, the predicted bit rate may be lower than the maximal bit rate. As shown in steps 6 and 7, the mobile station periodically estimates the link quality. Typical measures of link quality may be the received signal level (or power) on the BCCH, which is available during the idle mode, or carrier to interference ratio (C/I) estimate, bit error rate estimate, block error rate estimate and time dispersion estimate, which are typically available during active communication. In step 8 the mobile station measures interference levels on potential traffic channels. During this step, downlink interference from other cells using channels which are also available in the current cell is measured, i.e., co-channel interference. In step 9, the user's predicted bit rate is calculated. In making this calculation the mobile station uses: the maximal user bit rate for the connection, from step 4; the measured interference levels from step 8; and other factors affecting link quality, such as carrier to interference ratio (C/I), bit error rate, block error rate and time dispersion. A simplified equation representative of the calculations made in step 9 is:

$$M \times (1-N) = \text{Predicted Bit Rate}$$

where: M=the maximal bit rate (from step 4)
N=a percentage reduction of bitrate due to all limiting factors, i.e., low BCCH signal strength, interference, etc.

As will be understood by one skilled in the art, the terminal is predicting the bit rate (data throughput) available across the radio interface. Depending on various parameters associated with the fixed parts of the network, e.g., the link between a BTS and a BSC, the network bit rate may be different than that available on the radio interface, but it is assumed for these examples that the radio interface is normally the limiting factor. If, however, the network throughput is the limiting factor, then this too could be broadcast by the base station on the BCCH and used by the mobile to display the maximal and/or predicted bit rate seen by the user. Finally in FIG. 3, the predicted bit rate is outputted to the user. This output may be in the form of a display on the terminal, but other output means may also be used, such as audio.

Figure 4:
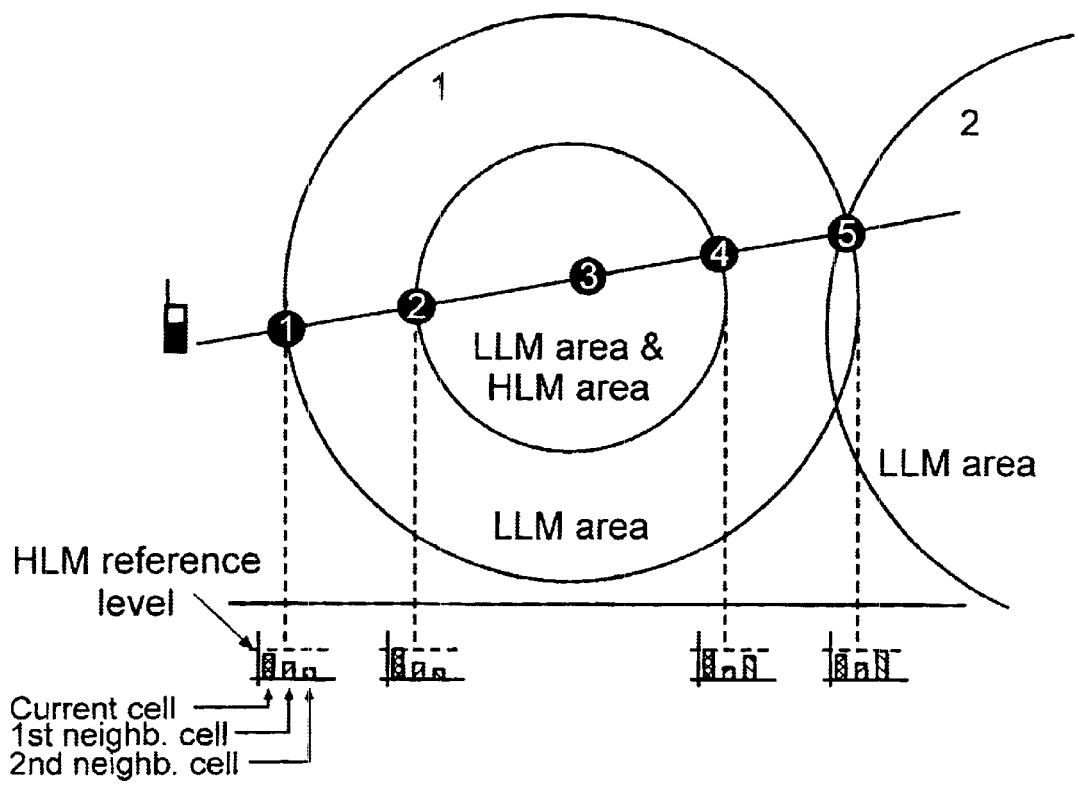
FIG. 4 illustrates an idle mode operation of a 4-slot mobile station in a LLM/HLM cell according to an exemplary embodiment of the present invention.

FIG. 4 provides an example of idle mode operation of a mobile station in accordance with the present invention. The bar graphs at the bottom of FIG. 4 are used to show received link quality at the mobile station. When link quality reaches a specified reference level, high level modulation (HLM) may be used, if supported by the mobile station. The first bar is associated with cell number 1. The second bar is associated with a cell that is not shown, and the third bar is associated with cell number 2. In this example the mobile station is capable of communicating using up to 4 time slots and two levels of modulation (low level modulation, LLM and high level modulation, HLM). In step 1, of FIG. 4, the mobile station enters a cell with HLM and LLM capability. As described above, the mobile station reads the control channel broadcast by the base station associated with this cell to identify the base station's capabilities, in this example 1–8 time slots and two possible modulation/coding schemes. The maximal bit rate indicator shows the bit rate maximally achievable with a connection supported with HLM and 4 slots, i.e., as limited by the mobile station's capabilities. However, HLM mode is only usable if the mobile is receiving signals from the base station with at least some predetermined link quality. In its current (step 1) location there is no HLM coverage and so the predicted bit rate indicator shows a predicted bit rate based on using LLM and 4 time slots. This scenario is illustrated by FIG. 5(*a*), which uses a bar graph to clearly display the two bit rates to the user. At this point the user can compare the maximal and the predicted bit rate indicators. This comparison will show the user that, within his current cell, he or she could achieve a higher bit rate by moving to a location in which the predicted bit rate is closer or equal to the maximal bit rate.

Figure 5A:
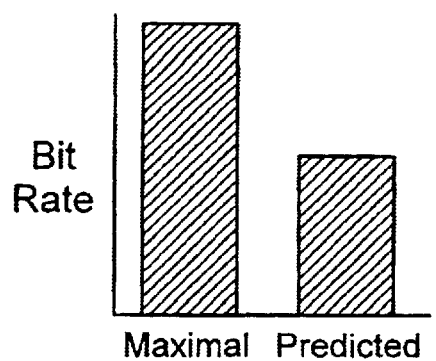
FIGS. 5(a)–(e) are examples of bit rate indicators which may be shown on the display of a mobile station and are associated with FIG. 4.
Figure 5B:
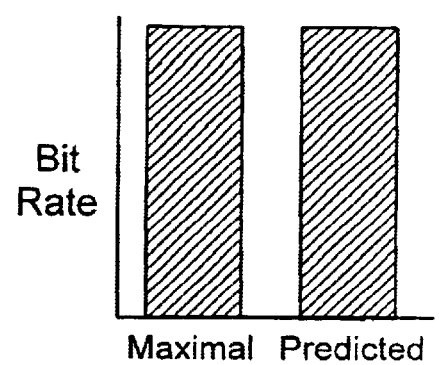
Figure 5C:
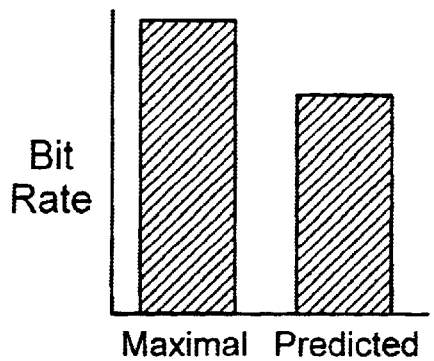
Figure 5D:
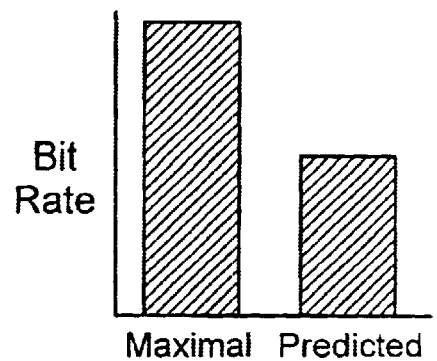
Figure 5E:
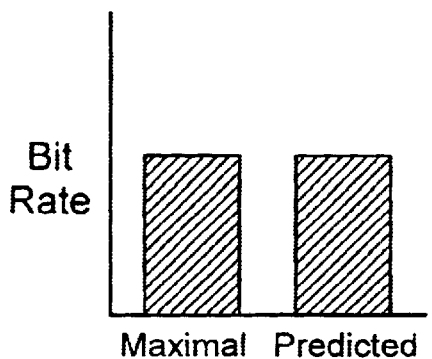

In step 2, the mobile station enters an area of the cell where HLM coverage is available, i.e., the link quality is above a predetermined HLM reference level. The predicted bit rate then increases to reflect the ability to support a connection with both HLM and 4 time slots, as shown by FIG. 5(b). Step 3 is added to illustrate that while in the HLM coverage area the predicted bit rate may not always be the same as the maximal bit rate. For example, the traffic load may increase in the cell and as a result a maximum of only 3 time slots per connection may be available. If this happens the predicted bit rate indicator will change to an expected bit rate associated with only 3 time slots, but still using HLM, as illustrated in FIG. 5(c). In step 4, the mobile station is leaving the HLM coverage area. Link quality goes below the HLM reference level and the predicted bit rate indicator is decreased to a LLM bit rate, as shown in FIG. 5(d). Step 5 illustrates a mobile station leaving the cell in which HLM coverage was available and entering a cell which supports LLM only. The mobile station again reads this information regarding the base station's capabilities on the control channel. As a result the maximal bit rate indicator decreases from a maximal HLM bit rate to a maximal LLM bit rate, shown by FIG. 5(e). This will let the user know that no matter where he travels within the current cell, he will not be able to achieve a HLM bit rate.

FIGS. 5(a)–(e) are examples of one way in which the maximal and predicted bit rates may be shown on the display of the mobile station. Each of the two bars, representing maximal and predicted bit rate respectively, would change dynamically, in accordance with the criteria mentioned above, as the user changes position within a cell or changes cells. The bit rate indicator bar graph of FIGS. 5(a)–(e) could occupy a small portion of the display on the mobile station and be a full time display. It could also be called up by a menu on the display screen of the mobile station and be a selected display which could fill the entire screen on the mobile station. The bar graphs of FIGS. 5(a)–(e) are meant only as an example of one type of visual display. The bit rate could be indicated by other visual means or by audio means.

Although the invention has been described and illustrated with reference to specific embodiments thereof, it is not intended that the invention be limited to these illustrative embodiments. Those skilled in the art will recognize that modifications and variations can be made without departing from the spirit of the invention.

What is claimed is:

1. A method for indicating a maximal transmission quality, comprising the steps of:
   receiving, at a mobile station, a message from a base station, indicating at least one base station transmission capability;
   determining the maximal transmission quality of a connection based on said maximal base station transmission quality capability and a maximal mobile station transmission quality capability; and
   outputting said maximal transmission quality on said mobile station.

2. The method of claim 1, where said maximal transmission quality is maximal bit rate.

3. The method of claim 1, further comprising:
   measuring, at said mobile station, link quality of at lest one channel;
   estimating a predicted transmission quality based on, at least one of, mobile station capability and said link quality; and
   outputting said predicted transmission quality at the mobile station.

4. The method of claim 3, wherein said link quality is at least one of: a signal strength on a broadcast channel, an interference level, and a carrier to interference power ratio.

5. A mobile station for indicating a maximal transmission quality, comprising:
   a receiver for receiving a message indicating a maximal base station transmission quality capability;
   a processor for determining said maximal transmission quality of a connection based on said maximal base station transmission quality capability and a maximal mobile station transmission quality capability; and
   an output device for outputting said maximal transmission quality on said mobile station.

6. The mobile station of claim 5, wherein the output device is a display.

7. The mobile station of claim 5, wherein said maximal transmission quality is a maximal bit rate.

8. The mobile station of claim 5, wherein:
   said receiver receives a signal over at least one channel;
   said processor measures a link quality of the at least one channel, and estimates a predicted transmission quality, based on, at least one of, the mobile station's capability and said link quality; and
   said output device outputs said maximal transmission quality and said predicted transmission quality together on the mobile station to allow a user to compare the maximal transmission quality with the predicted transmission quality.

9. The method of claim 8, wherein said link quality is at least one of: a signal strength on a broadcast channel, an interference level, and a carrier to interference power ratio.

* * * * *